United States Patent [19]

Thompson et al.

[11] Patent Number: 4,930,725
[45] Date of Patent: Jun. 5, 1990

[54] PUSHER PROPELLER INSTALLATION FOR TURBOPROP ENGINES

[75] Inventors: Craig E. Thompson, Gilbert; Jack H. Rowse, Tempe, both of Ariz.

[73] Assignee: Allied-Signal Inc., Morris Township, Morris County, N.J.

[21] Appl. No.: 285,822

[22] Filed: Dec. 16, 1988

[51] Int. Cl.$^5$ ............................................. B64D 29/00
[52] U.S. Cl. .................................... 244/53 R; 244/65; 244/57; 60/226.1
[58] Field of Search ...................... 244/13, 54, 55, 65, 244/53 R, 53 B, 57; 60/226.1, 262, 263, 224

[56] References Cited

U.S. PATENT DOCUMENTS

| | | |
|---|---|---|
| 2,456,151 | 12/1948 | Sawyer . |
| 2,526,941 | 10/1950 | Fishbein . |
| 2,604,276 | 7/1952 | Huben . |
| 2,627,927 | 2/1953 | Mergen . |
| 2,726,725 | 12/1955 | Nichols . |
| 3,811,791 | 5/1974 | Cotton . |
| 4,171,183 | 10/1979 | Cornell et al. . |
| 4,488,399 | 12/1984 | Robey et al. . |

FOREIGN PATENT DOCUMENTS

| | | |
|---|---|---|
| 763600 | 12/1951 | Fed. Rep. of Germany . |
| 860037 | 9/1941 | France . |
| 999942 | 6/1952 | France . |
| 564117 | 9/1944 | United Kingdom . |
| 621607 | 5/1949 | United Kingdom . |
| 622768 | 5/1949 | United Kingdom . |

Primary Examiner—Galen Barefoot
Attorney, Agent, or Firm—R. Steven Linne; James W. McFarland; Robert A. Walsh

[57] ABSTRACT

A pusher turboprop engine is provided with an interior exhaust duct structure which directs the hot turbine gases through and out of the engine nacelle and around the rear spinner which surrounds the propeller hub. The spinner supports blade-shaped shields which protect the roots of the propeller blades from the hot exhaust gasses.

9 Claims, 3 Drawing Sheets

PUSHER PROPELLER INSTALLATION FOR TURBOPROP ENGINES

CROSS-REFERENCE TO RELATED APPLICATION(S)

This application is related to an invention disclosed in copending application Ser. No. 187,619, filed on Apr. 28, 1988, now U.S. Pat. No. 4,892,269, which is assigned to the assignee of the present invention.

1. Technical Field

This invention relates generally to gas turbine driven propeller systems for aircraft propulsion and more specifically to an improved arrangement for ducting a hot exhaust gas stream through the interior, and out of the aft end, of the engine nacelle with minimum interference with a downstream located "pusher" propeller assembly.

2. Background of the Invention

Gas turbine driven propeller systems for aircraft propulsion (i.e., turboprops) have been generally known in the industry for a long time but recently there has been a renewed interest in such configurations because of several heretofore unappreciated advantages over conventional jet engines.

Turboprops may not fly as fast as jets but can be much more fuel efficient. In addition, turboprops are generally more effective on shorter flights since they typically have higher rates of climb. One problem with conventional turboprops has been their high noise level but recent development of "pusher" configurations, in which the propellers are placed behind the engine and cabins, have essentially eliminated the problem by producing a quiet cabin environment. However, there are several new problems created by utilizing such a pusher configuration.

One of the major difficulties in designing a pusher propeller installation for modern aircraft, when a gas turbine engine is used as the power source, is to prevent mutual interference between the pusher propellers and the engine exhaust flow without seriously reducing either the propeller efficiency or jet thrust. Exhaust of the hot jet through the propeller blades may introduce vibrational and thermal problems in the blades and simultaneously interfere with the exhaust jet. Modern nonmetallic, or even aluminum, propeller blades cannot long resist the hot jet. Even when the exhaust is mixed with cold ambient air to reduce its temperature to only a few hundred degrees, thermal fatigue shortens the life of the blades and, of course, reduces the amount of jet thrust available for propulsion.

Several approaches have been proposed to avoid or solve some of these problems. Deflection of the jet gasses laterally to a point beyond the propeller radius has been tried (see, for example, U.S. Pat. No. 2,604,276) but results in an excessive sacrifice of space in order to accommodate a gas duct of sufficient length and volume to carry the exhaust to a safe distance outboard of the propellers. In addition, the introduction of pronounced bends in the exhaust path, or the placement of the exhaust vent at an angle to the line of flight, leads to losses in jet thrust and to other detrimental effects, such as increased back pressure on the turbine, which reduces the power available for propeller thrust, and decreased aerodynamic efficiency due to higher drag losses.

Another problem with turboprop engines involves proper cooling of the engine nacelle, internal components and engine oil. Since the propeller system by itself cannot usually supply an adequate flow of cooling air, especially at low air speeds on the ground during idle and when the propellers are "feathered", additional internal cooling devices such as electrically powered fans, are usually required. However, the additional complexity and reliability of such devices are detrimental to overall aircraft availability.

In view of the foregoing, it should be apparent that there is a need in the art for improvements in the design of pusher turboprop engine installations. Therefore, it is a primary object of the present invention to provide an improved method of, and structure for, ducting turbine exhaust directly out the rear of the engine nacelle without passing through the nacelle sidewalls.

It is also an object of the present invention to provide a turboprop engine in which standard pusher propellers can be separated from the detrimental effects of the hot turbine exhaust gasses.

It is further an object of this invention to achieve such a separation with a minimum of loss in jet thrust and/or propulsive force from the propellers.

Another object of this invention is to provide an improved method of cooling a turboprop engine at low air speeds by pulling air through the engine nacelle with an exhaust driven eductor.

SUMMARY OF THE INVENTION

The present invention aims to overcome the disadvantages of the prior art as well as offer certain advantages by providing a turboprop engine having a novel exhaust duct structure which includes a rearwardly-directed internal gas channel directing the hot products of combustion from the turbine outlet ports into a nozzle-like momentum exchange plenum where nacelle cooling air is educted into the exhaust gas stream. The combined gas stream is forced downstream in an exhaust flow path directed over the surface of a rotatable spinner which covers the pusher propeller hub assembly. Extending from the spinner into the exhaust flow path are hollow, aerodynamically shaped cuffs circumscribing the root portion of each propeller blade to protect it from the hot gas stream.

The present invention not only provides an aerodynamically smooth nacelle without the prior art's protruding exhaust horns (which reduces aerodynamic drag by about 10%), but also ensures adequate cooling of the turboprop engine and components during low air speed operation, such as ground idle or taxiing, wherein the propeller air flow would not, without the exhaust eductor, be sufficient to pull enough cooling air through the nacelle.

The propeller cuffs in the exhaust flow path may be designed to provide various degrees of back pressure to the eductor it is preferred that the overall engine efficiency, not the educted flow, is maximized at the designed cruising speed. That is, the cuffs may provide a low or even sub-ambient pressure at the exit of the momentum exchange plenum in order to improve the eductor flow at low speeds, but it is more important to prevent excessive back pressure at high speeds.

Since the propeller blades are protected from direct contact with the hot exhaust gasses by the hollow blade shaped cuffs, standard or non-metallic blade assemblies may be used without the vibration and thermal problems usually associated with pusher turboprop engines.

BRIEF DESCRIPTION OF THE DRAWINGS

While this specification concludes with claims particularly pointing out and distinctly claiming the subject matter which is regarded as the invention, it is believed that the objects, features and advantages thereof may be better understood from the following detailed description of a presently preferred embodiment when taken in connection with the accompanying drawings in which:

DESCRIPTION OF THE PREFERRED EMBODIMENT

Figure 1:
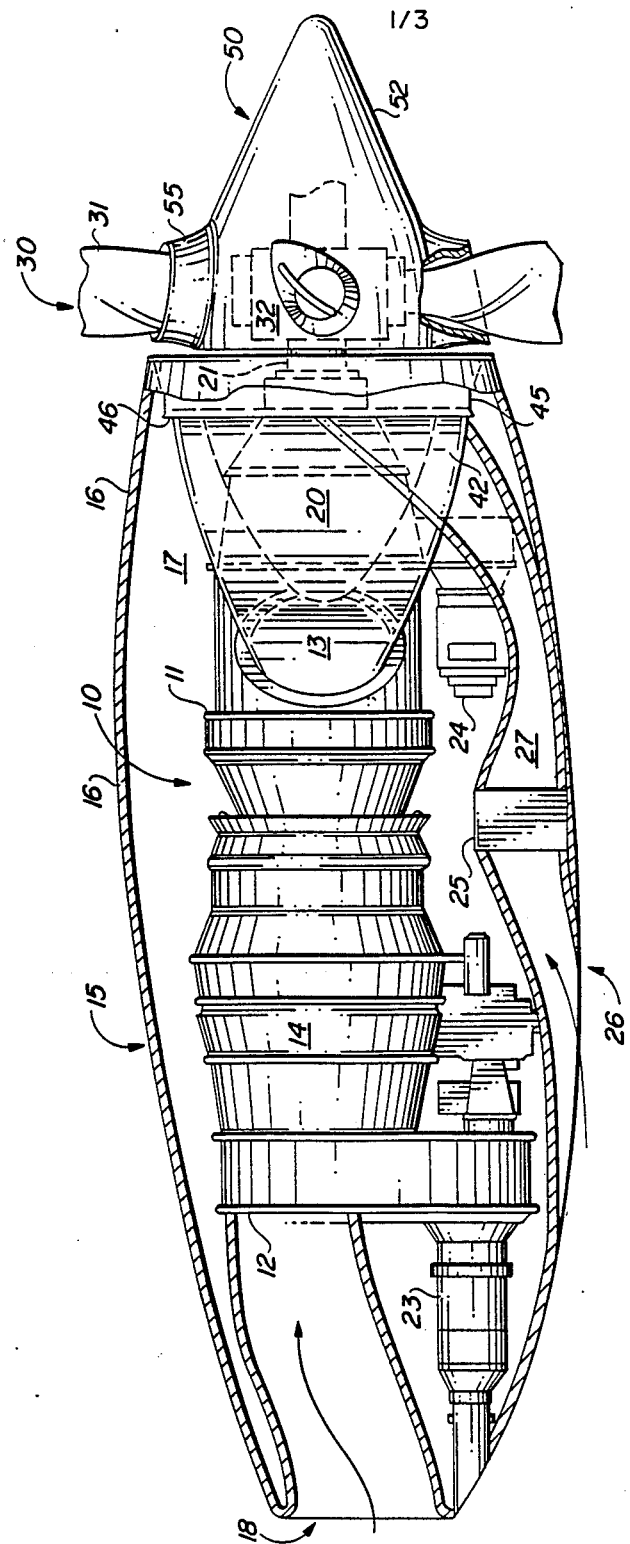
FIG. 1 is a side elevational view, in partial cross-section, illustrating a turboprop engine incorporating the present invention.

FIG. 1 illustrates a partial sectional view through a pusher turboprop engine assembly incorporating the present invention. The assembly generally comprises a gas turbine engine (10) surrounded by an aerodynamic housing or nacelle (15) and connected, through a speed reducing gear box (20) on its aft end, to a standard propeller mechanism (30) which is surrounded by a rotatable spinner assembly (50).

In more detail, the turbine engine (10) includes an elongate fore-and-aft extending engine housing (11) defining a main air inlet port (12), in the forward end, and having at least one, but preferably two, exhaust outlet ports (13) located on each side of the housing near the aft end. The housing (11) contains the typical compressor, combustor, and turbine sections (14) along with their associated operating components (not shown) for producing a flow of high temperature pressurized combustion products and mechanical power. The engine (10) also includes the usual accessories, such as a starter (23), generator (24), oil cooler (25), and other well-known operating components.

Mechanical power is extracted from the engine (10) by an output shaft (21) through an in-line gear box (20) located rearwardly of the exhaust outlet ports (13).

The nacelle (15) includes an outer sheet metal skin or wall (16) which surrounds the engine (10) and gearbox (20) with an aerodynamically favorable outward configuration. A nacelle cavity (17) is thereby formed between the outer wall (16) and the engine housing (11). The lower portion of the nacelle (15) also includes a cooling air inlet (26) which directs air through the engine oil cooler (25) and thence rearwardly through cooling air exhaust duct (27) towards and out the aft end of the nacelle as will be explained in more detail later. The forward end of the nacelle (15) includes a main air inlet (18), communicating air to the engine inlet port (12), while the aft end of the nacelle terminates at a transverse plane located between the gearbox (20) and the spinner assembly (50).

Figure 2:
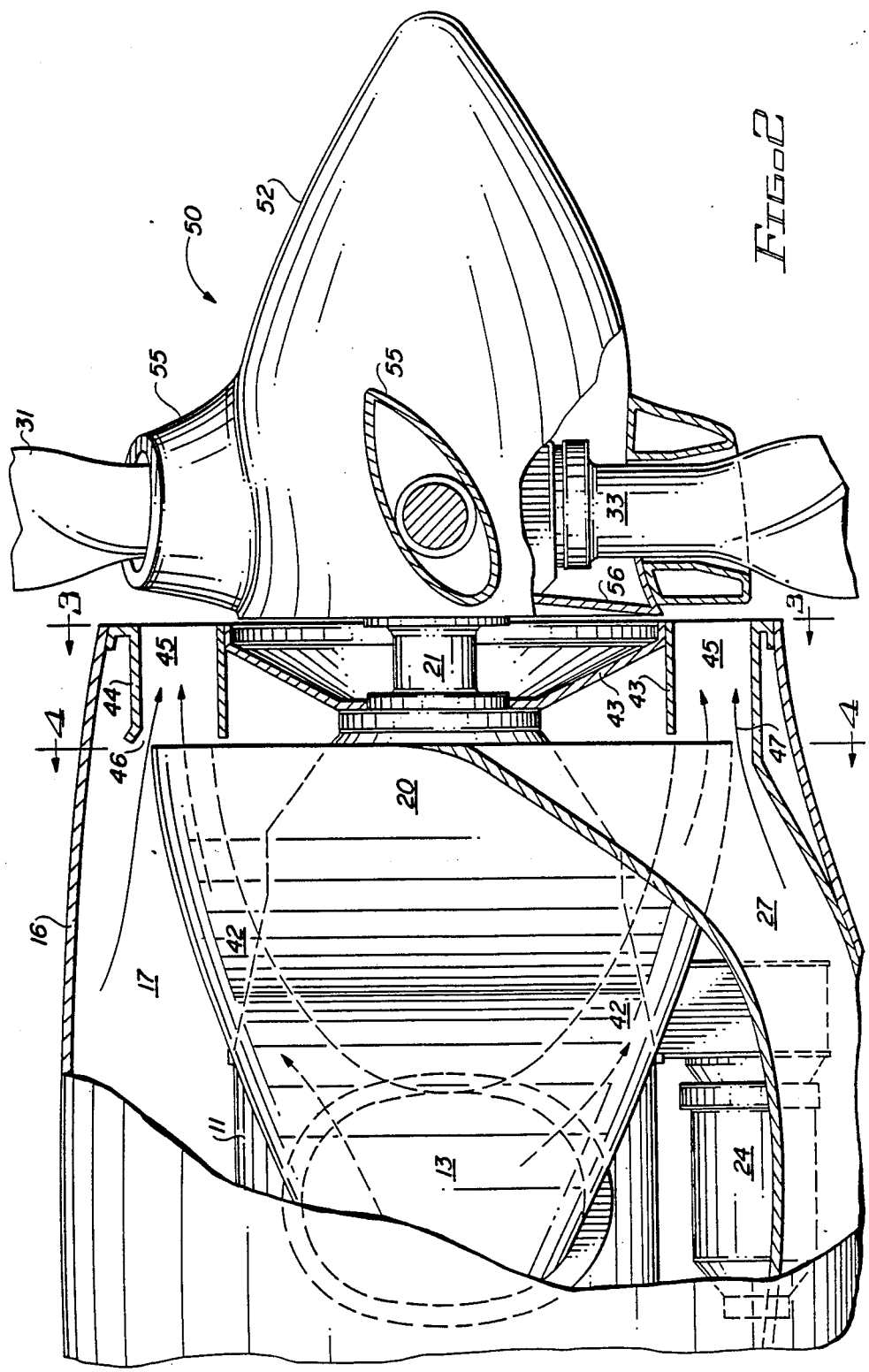
FIG. 2 is an enlarged view of the rearward portion of FIG. 1 showing additional details.
Figure 3:
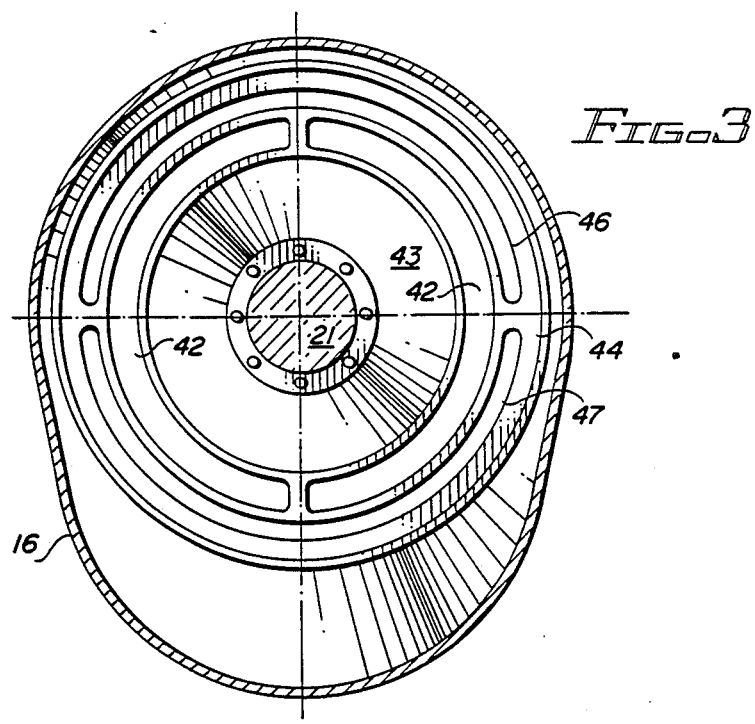
FIG. 3 is a transverse cross-sectional end view of the engine taken along line 3—3 of FIG. 2.

As shown more clearly in FIGS. 2 and 3, the aft end of the nacelle includes an annular, open-ended plenum (45) formed between the nacelle skin (16), or more preferably a sheet metal attachment thereto (44), and an aft bulkhead (43) surrounding the gearbox output shaft (21). This plenum (45) is open rearwardly to the atmosphere and open forwardly so as to be in flow alignment with: first, a turbine exhaust transition duct (42) communicating with the turbine outlet ports (13); second, a nacelle air injection inlet (46) communicating with the nacelle cavity (17); and third, a cooling air injector inlet (47) communicating with a cooling air exhaust duct (27) coming from the oil cooler (25) or other heat exchangers.

Figure 4:
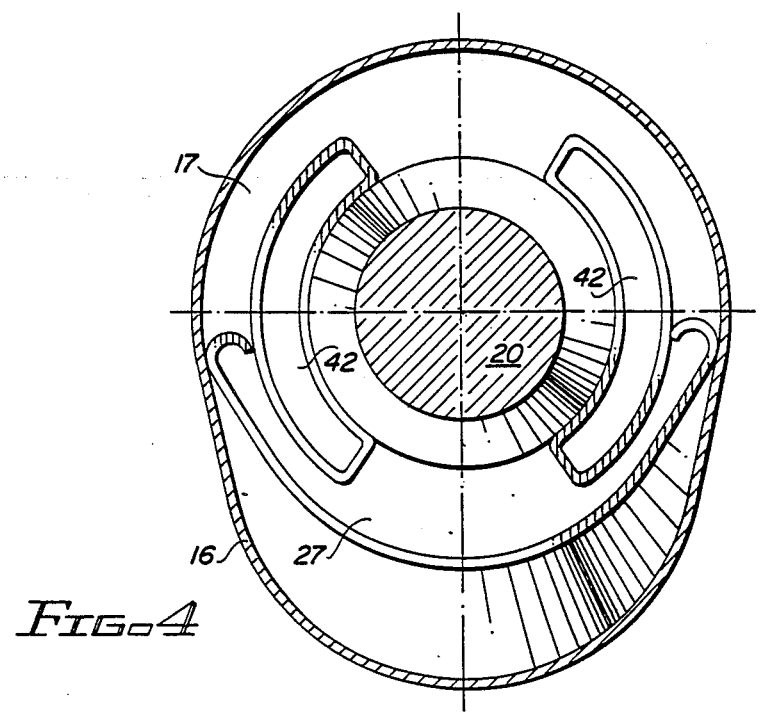
FIG. 4 is a transverse cross-sectional interior view taken along line 4—4 of FIG. 2.

The turbine exhaust transition ducts (42) are preferably constructed to terminate in two semi-annular outlets, of approximately 120° extent, surrounding the gearbox (20) as shown best in FIG. 4. Surrounding the exhaust transition ducts (42) are open areas (17,27) from or through which air is drawn by the flowing exhaust gases into the plenum (45). Air from the top of the nacelle cavity (17) is educted into the upper portion of the plenum (45) through the air injector inlet (46) while air from the cooling air injector (47) is educted into the lower portion of the plenum (45). Each half of the plenum (45) preferably expands circumferencially from about 120° at the injector inlet plane (shown in FIG. 4) to about 170° at the exit plane (shown in FIG. 3) to minimize vibrations in the propeller assembly.

A rotatable spinner assembly (50) is located aft of the nacelle (15) and includes a rearwardly convergent, generally conical surface (52), which provides environmental protection to the propeller mechanism (30). Preferably, the cross-sectional area of the spinner surface (52) is reduced somewhat between the propeller blades to provide area ruling of the exhaust flow path.

Extending from the surface (52) are several radially extending, hollow, airfoil-shaped cuff members (55) which loosely surround the root portion (33) of the propeller blades (31). A spinner bulkhead (56) is preferably provided to protect the interior of the spinner, which contains the propeller mechanism (30), from the environment.

The propeller mechanism (30), shown schematically in FIG. 1, is well-known in the art and generally includes a hub (32) containing the pitch control machinery (not shown) and three to six radially extending propeller blades (31). Each of the blades (31) are attached to the hub (32) at its root (33) and passes radially through an opening in the spinner surface (52), through the hollow cuff member (55), and outwardly into the atmosphere. The cuffs (55) are fixed in position and do not twist with the propeller during blade pitch changes.

The operation of this turboprop engine is similar in many respects to that of prior art engines except for the handling of the air and exhaust flow as discussed below. Basically, the turbine engine (10) ingests air and fuel into the gas generator portion (14), the details of which are not shown, to produce mechanical power to drive the propellers and produce a high temperature, high velocity exhaust jet.

The turbine exhaust flows from the outlet ports (13), around the gearbox (20) through transition ducts (42) and into the momentum exchange plenum (45) where its kinetic energy or momentum is used to aspirate warmed air from the two closely adjacent injectors (46) and (47) before exiting through the spinner duct (51) as a rearwardly directed jet.

The cooling air injector (47) draws air through the engine oil cooler (25) to extract energy therefrom, while the nacelle injector (46) draws warm air from the cavity (17) surrounding the engine and accessories. Sufficient cooling air is easily provided during normal flight operation because of the large mass flow through the turbine (10) and into the momentum exchange plenum (45). Even during lower power operations, such as ground idling or taxiing, there is usually enough mass flow through the engine to aspirate sufficient cooling air because of the efficient eductor design of the present invention.

From the above description it should be apparent that the propulsion engine arrangement described by mounting the propeller assembly to the rear of the turbine engine enables the engine to have a conventional intake which provides a suitable method of ducting the engine exhaust to the atmosphere without interference with the aft-mounted propellers or unnecessary loss of jet thrust.

While in order to comply with the statute, this invention has been described in terms more or less specific to one preferred embodiment, it is expected that various alterations, modifications, or permutations thereof will be apparent to those skilled in the art. Therefore, it should be understood that the invention is not to be limited to the specific features shown or described but it is intended that equivalents be embraced within the spirit and scope of the invention as defined by the appended claims.

What is claimed is:

1. Aircraft apparatus having a forward flight direction and comprising:
    a gas turbine engine, said engine including an elongate fore-and-aft extending housing defining an inlet port through which is inducted ambient air, a compressor receiving said inducted air and discharging said air pressurized, a combustor receiving said pressurized air along with a supply of fuel to support combustion producing a flow of pressurized high temperature combustion products, a turbine rotatable in said flow of combustion products to extract mechanical power therefrom for driving connection to a rearwardly extending rotatable output shaft having a direction of rotation and being carried exclusively by said engine, and an outlet port communicating with ambient and discharging said flow of combustion products at a relatively lowered temperature and pressure from said engine;
    a rotatable propeller unit having a hub carried by said output shaft rearwardly of said engine and drivingly connecting thereto for delivering mechanical power therefrom to a plurality of radially extending propeller blade members carried by said hub, each propeller blade member of said plurality including a root portion adjacent said hub and an aerodynamic airfoil portion extending radially outwardly of said root portion, said propeller unit rotatingly reacting with ambient air to generate propulsive force for conveyance to said aircraft via said engine;
    nacelle means for providing environmental protection to said engine while affording an aerodynamically favorable outward configuration, said nacelle having an air inlet, opening to ambient and communicating ambient air to said engine inlet port, said nacelle cooperating with said engine housing to define a nacelle cavity enveloping the latter, and said nacelle terminating rearwardly at a transverse plane proximate to but forward of said plurality of propeller blade members, means for inflow of ambient cooling air to said nacelle cavity:
    generally rearwardly convergent conical spinner means extending rearwardly from said transverse plane for providing environmental protection to said propeller mechanism while affording an aerodynamically favorable outward configuration, a plurality of radially extending cuff members each receiving therein a respective one of said plurality of propeller blade members adjacent the root portion thereof,
    transition duct structure, at a forward end thereof communicating with said engine outlet port to receive said flow of combustion products, said transition duct structure extending rearwardly to terminate forwardly of said transverse plane in a semicirculuar outlet, an annular momentum exchange plenum forwardly aligning with said transition duct outlet to define an inlet to said momentum exchange plenum and extending aft, said transition duct directing said flow of combustion products rearwardly across said momentum exchange plenum to induce additional gaseous inflow at said inlet thereof, and
    said momentum exchange plenum conveying said flow of combustion products and additional gaseous inflow to the atmosphere forwardly of said spinner means.

2. The aircraft apparatus of claim 1 wherein said inlet of said momentum exchange plenum communicates with said nacelle cavity whereby ambient ventilating air is moved through said nacelle cavity by a momentum exchange with said flow of combustion products as an ejector.

3. The aircraft apparatus of claim 1 wherein said nacelle means defines an inlet opening forwardly for receiving ambient ram air during forward motion of said aircraft, a cooling duct communicating with said inlet extending rearwardly and communicating at the aft end thereof with said inlet of said momentum exchange plenum, and heat exchange means disposed in said cooling duct for liberating heat to air flow therein, whereby ambient cooling air is moved from said inlet rearwardly through said cooling duct by a combined effect of momentum exchange with said flow of combustion products, as an ejector without necessity of forward motion of said aircraft, and said cooling air is additionally moved through said cooling duct during forward aircraft motion by ram air effect.

4. The apparatus of claim 1 wherein said engine housing defines a pair of said outlet ports each generally diametrically opposite the other, a pair of said transition duct structures respectively communicating with said pair of outlet ports respectively, each one of said pair of transition duct structures defining a semicircular outlet substantially of 120° arcuate shape, said pair of transition duct structures joining forward of said respective outlets thereof to define an annularly continuous unitary outlet.

5. The apparatus of claim 4 wherein said momentum exchange plenum is annular to circumscribe said engine housing.

6. The apparatus of claim 1 wherein each of said plurality of cuff portions movably receives said respective one of said plurality of propeller blade members to permit pitch change of said propeller unit by pivotal movement of said plurality of propeller blade members upon said hub without interference by said spinner means.

7. In an aircraft having an engine nacelle, a free turbine engine disposed within said nacelle, an output shaft driven by said free turbine of said engine, and an exhaust port from which flows combustion products from a gas generator portion of said engine, said combustion products powering said free turbine, and a variable pitch air screw having a range of rotational speeds being drivingly carried by said output shaft, so that said aircraft has at least two modes of operation characterized by: (a) ground handling—with aircraft air speed being slow, or stopped, and gas generator speed being ground idle or taxi speed and flow rate of combustion products also being comparatively low with propeller pitch being fine, or zero, to result in a low-range propeller rotational speed; and (b) flight operation with aircraft speed being comparatively high; the method of ensuring cooling air flow within said nacelle and around said turbine engine during both operational modes (a) and (b) comprising the steps of:

providing a forwardly opening cooling air inlet on said nacelle for receiving cooling air flow by ram air effect during operating mode (b):

providing an ejector structure, receiving at a nozzle portion thereof said flow of combustion products, and aspirating vitiated air at an inlet of said ejector structure within said nacelle by momentum exchange with said combustion products to strongly assist cooling air flow during operating mode (b), while providing a comparatively smaller but significant effect on cooling air flow during operating mode (a);

providing thick airfoil-shaped hollow fan blades which movably receive therethrough radially extending blade root portions of said air screw, disposing said fan blades in a pitch position having the same sense as air foil portions of said air screw during forward propulsion of said aircraft;

flowing said combustion products and vitiated air rearwardly from said ejector structure to a low pressure area forwardly of said air screw to assist extraction of said combustion products and vitiated air from said ejector structure.

8. A turboprop engine for aircraft propulsion, of the type having a rotatable propeller and spinner assembly mounted downstream of a gas turbine engine, comprising:

a nacelle means for providing an aerodynamically favorable outward configuration for the gas turbine engine;

a turbine exhaust duct means for directing combustion products from the turbine engine to the atmosphere, said exhaust duct means located completely within the nacelle and terminating adjacent the aft end of the nacelle;

a plurality of propeller blades extending radially from the interior of the spinner;

a plurality of hollow cuff members extending radially from the spinner and surrounding each of the propeller blades at least where they pass through the turbine exhaust; and said turbine exhaust duct means including a transition duct structure which has a forward end in communication with an outlet port in the side of the turbine engine and a rearward end terminating in a semicircular outlet adjacent an open-ended momentum exchange plenum located in the aft end of the nacelle.

9. The engine of claim 8 wherein said momentum exchange plenum is open rearwardly to the atmosphere and open forwardly to the transition duct outlet, a nacelle air injector, and a cooling injector; said nacelle injector communicating with the interior of the nacelle and said cooling injector communicating to a cooling duct.

* * * * *